United States Patent [19]
Buis

[11] Patent Number: 5,531,364
[45] Date of Patent: Jul. 2, 1996

[54] ANTI-THEFT CAGE FOR SECURING A HELMET ON A MOTORCYCLE

[76] Inventor: Joseph Buis, 1518 Rockwood St., Los Angeles, Calif. 90026

[21] Appl. No.: 262,017

[22] Filed: Jun. 17, 1994

[51] Int. Cl.$^6$ .................................................. B62J 11/00
[52] U.S. Cl. .......................... 224/413; 224/495; 224/423; 224/446; 224/460
[58] Field of Search ............................. 224/33 R, 32 A, 224/488, 495, 535, 314, 315, 42.31, 919

[56] References Cited

U.S. PATENT DOCUMENTS

| | | | |
|---|---|---|---|
| 1,395,970 | 11/1921 | Nidermaier | 70/18 |
| 1,817,497 | 8/1931 | Smith et al. | 70/18 |
| 3,245,239 | 4/1966 | Zaidener | 70/211 |
| 3,604,671 | 9/1971 | Walker | 224/42.31 X |
| 3,762,191 | 10/1973 | Smith | 70/59 |
| 3,831,407 | 8/1974 | Coleman | 70/18 |
| 3,837,545 | 9/1974 | Rogers, Jr. | 70/59 |
| 4,024,738 | 5/1977 | Pi | 70/59 |
| 4,063,637 | 12/1977 | Danforth | 70/59 |
| 4,819,461 | 4/1989 | Pearson | 70/14 |
| 5,349,834 | 9/1994 | Davidge | 224/315 X |

*Primary Examiner*—Renee S. Luebke
*Attorney, Agent, or Firm*—David Pressman

[57] ABSTRACT

An anti-theft device for securing a helmet (44) on a motorcycle includes a set of straps (12 to 18) attached to each other at a generally central point and extending downwardly in radial directions to form a cage (10). One of the straps is a lockable strap (12) and includes a hole (38) disposed at a lower end. The lateral straps (16 and 18) each includes a hook (26) at a lower end for engaging the edges of the motorcycle's fender (28), and the rear strap (14) includes a hook (32) for engaging a hoop member (30) attached to the rear of the fender. A T-shaped anchor (42) with a hole (40) thereon is attached to the front of the fender. When the lockable strap is unlocked and raised, the helmet can be positioned within the cage. The lockable strap can then be lowered so that its hole aligns with the hole on the T-shape anchor, and a lock (46) can be inserted through the holes to lock the helmet in the cage. The helmet is thereby securely protected from theft and accidental damage. Alternatively, the cage can be made of straps with adjustable sleeves or steel cables.

11 Claims, 4 Drawing Sheets

ANTI-THEFT CAGE FOR SECURING A HELMET ON A MOTORCYCLE

BACKGROUND OF THE INVENTION

1. Field of the Invention

This invention relates generally to anti-theft devices, specifically to an anti-theft cage for securing a helmet on a motorcycle.

2. Prior Art

Motorcycles, because of their small size, have no built-in storage for helmets, but a helmet simply left sitting on a bike parked in a public place will be quickly stolen. Therefore riders are constantly coping with the problem of what to do with their helmets when they leave their motorcycles.

Some riders who have full-face helmets, (the type with chin protection) lock them to a wheel with a U-lock looped around the visor opening. However, this requires the helmet to be placed on the ground, where it can get dirty or wet, or it can be accidentally damaged. Furthermore, open-face helmets cannot be locked in this way at all, because they have no hole through which the shackle of a lock can be looped. As a result, many riders have to endure the inconvenience of carrying their helmets around with them wherever they go.

Various locking devices have been designed for securing helmets to vehicles. U.S. Pat. No. 3,762,191 to Smith (1973) shows chains arranged to form a lockable cage for receiving a helmet therein. Although it provides security, the chain-cage cannot be adjusted to fit helmets of different sizes. When the helmet is removed therefrom, the cage collapses into a pile of jumbled chains, so that placing a helmet therein again will be a cumbersome procedure.

U.S. Pat. No. 3,837,545 to Rogers, Jr. (1974) shows a helmet cage with two arched bars for engaging the sides of a helmet, and a lockable cross bar connecting the top of the arched bars for locking the helmet therein. The cage is attached to the side of a vehicle. This device also cannot be adjusted to fit helmets of different sizes, because the space between the arched bars is fixed by the non-adjustable cross bar. There is also insufficient space on the sides of most motorcycles for mounting this device.

U.S. Pat. No. 4,024,738 to Pi (1977) shows two loops for engaging the inside and outside of a helmet. The loops each include an elongated tap extending from its top. The taps are locked together and around any suitable bar-shaped member on a motorcycle for securing the helmet thereto. Just like the previous devices, this helmet lock is only designed to fit helmets of a single size. Furthermore, some motorcycles do not have suitable bar-shaped members on which this device can be locked.

U.S. Pat. No. 4,063,637 to Danforth (1977) shows a folding cage for receiving a helmet therein. Although the cage is lockable to the motorcycle, it is awkward to use, it can flop around and scratch the motorcycle, and it is not suitable for helmets of different sizes.

OBJECTS AND ADVANTAGES

Accordingly a primary object and advantage of the present invention is to provide an improved motorcycle helmet lock. Another object is to provide an anti-theft cage for securing a helmet on a motorcycle to protect it from theft, dirt, and accidental damage.

Additional objects and advantages of the present invention are to provide an anti-theft cage that can secure all types and sizes of helmets, to provide an anti-theft cage that can be installed at different locations on a motorcycle, and to provide an anti-theft cage that cannot be easily defeated.

Further objects and advantages of the invention will become apparent from a consideration of the drawings and ensuing description.

SUMMARY OF THE INVENTION

The foregoing objects and advantages are achieved with a set of hoop members or anchors permanently attached to the frame or fender of a motorcycle, and a set of curved metal straps arranged to form a cage. Hooks on the free ends of the straps engage the hoop members to removably attach the cage to the motorcycle. One of the straps is hinged, and includes a hole for being locked onto a T-shaped anchor, also with a hole therein. The cage can be opened by upwardly pivoting the hinged strap for receiving a helmet therein, and it can be closed and secured with a padlock on the hinged strap to protect the helmet from theft and accidental damage.

DRAWING REFERENCE NUMERALS

| | |
|---|---|
| 10. Cage | 12. Lockable Front Strap |
| 14. Rear Strap | 16. Lateral Strap |
| 18. Lateral Strap | 20. Square Ring |
| 22. Loop Portion | 24. Upper Hook |
| 26. Anchoring Hook | 28. Fender Of Motorcycle |
| 30. Hoop Member | 32. Anchoring Hook |
| 34. Bolt | 36. Tab Member |
| 38. Hole | 40. Hole |
| 42. T-Shaped Anchor | 44. Helmet |
| 46. Padlock | 50. Cage |
| 52. Square Ring | 54. Lockable Front Strap |
| 55. Rear Strap | 56. Lateral Strap |
| 57. Hook | 58. Lateral Strap |
| 60. Anchoring Hook | 62. Hoop Member |
| 64. Fuel Tank Of Motorcycle | 66. Hoop Member |
| 68. Trim On Motorcycle | 70. Tab Member |
| 72. Hole | 74. Hole |
| 76. T-Shaped Anchor | 78. Instrument Panel |
| 80. Hinge | 82. Adjustable Strap |
| 84. Sleeve | 86. Hole |
| 88. Hole | 89. Rivet |
| 90. Hook | 92. Strap |
| 94. Flexible Steel Cable | 96. Steel Tube |
| 98. Tip | 100. Ring |
| 102. Cage | 104. Crimp |
| 106. Anchoring Hook | 108. Hole |

Figure 1A:
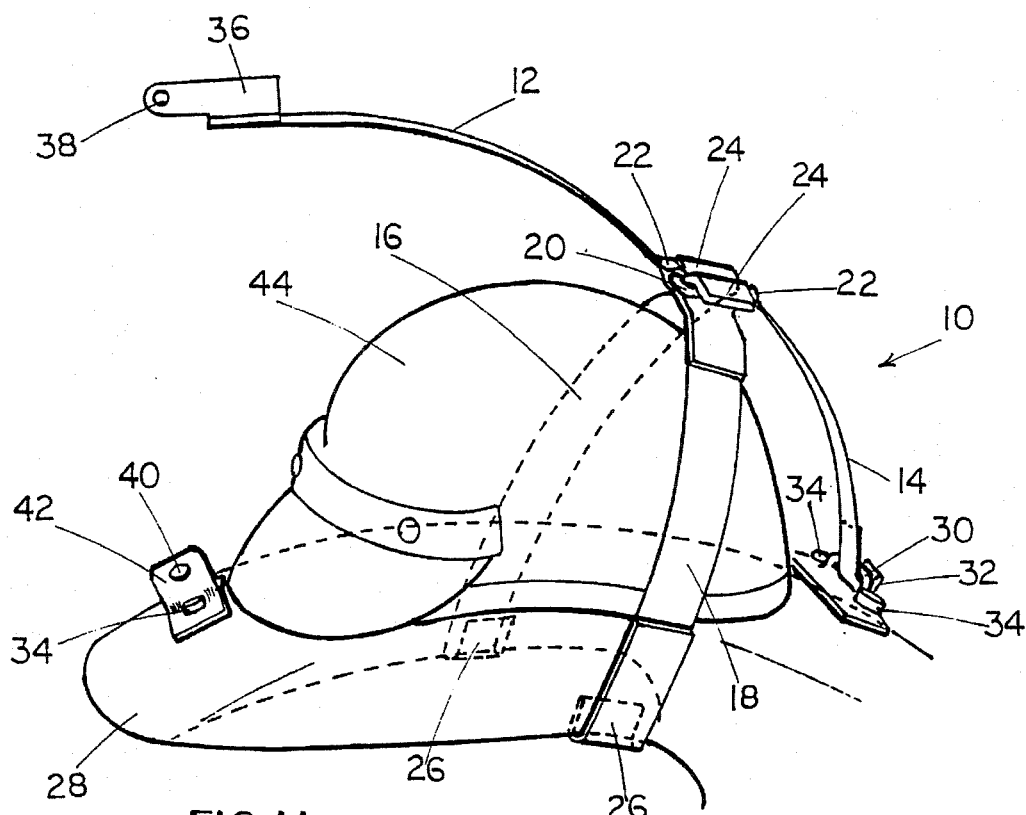
FIG. 1A is a side perspective view of an anti-theft cage for a helmet in accordance with a first embodiment of the invention.
Figure 1B:
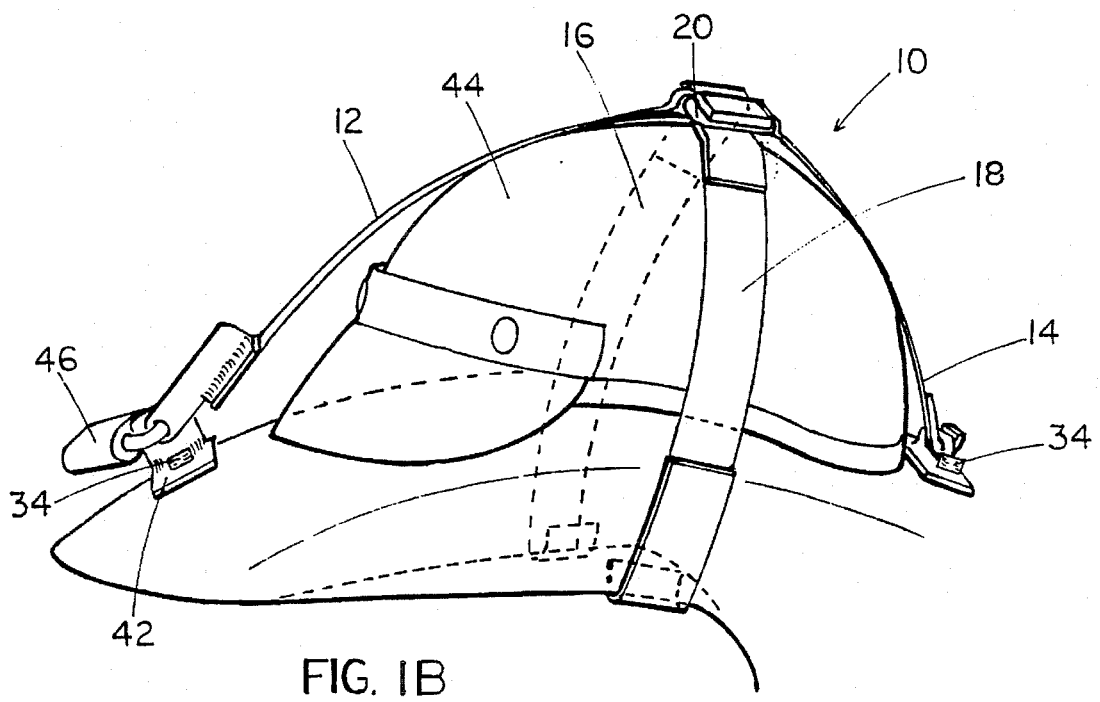
FIG. 1B is a side perspective view of the anti-theft cage of FIG. 1A in a locked condition.

Description—FIGS. 1A and 1B—Installation on Fender

In accordance with a first embodiment of the invention shown in the side perspective view in FIG. 1A, an anti-theft cage 10 for helmets includes a curved, front lockable, fore-and-aft strap 12; a curved rear fore-and-aft strap 14; and a pair of curved lateral straps 16 and 18. Each of straps 12 and 14 has a loop 22 at an upper end pivotably connected to opposite sides of a square ring 20, and each of straps 16 and 18 has an outwardly-facing hook 24 at an upper end pivotably connected to the other, opposite sides of ring 20.

Each of straps 16 and 18 has an inwardly-facing hook 26 at a lower end engaging the rim of a fender 28 of a motorcycle (partially shown). Strap 14 has an outwardly-facing hook 32 at a lower end engaging a hoop member 30 which is permanently attached to fender 28 with two tamper-proof (prison) bolts 34. A tab 36, which is attached perpendicularly to the surface of lockable strap 12, has a hole 38 at a distal end thereof for aligning with a hole 40 on a T-shaped anchor 42 permanently attached to fender 28 with two prison bolts 34 (one shown). Lockable strap 12 is shown disengaged from anchor 42 and pivoted upwardly, so that a helmet 44 can be received in cage 10.

As shown in FIG. 1B, helmet 44 can be secured in cage 10 by lowering and locking strap 12 onto anchor 42 and extending the shackle of a padlock 46 through their respective holes. The straps are suitably sized for snugly fitting over helmet 44, and are made of steel so that they cannot be easily cut or deformed to release the helmet without removing the lock. Tamper-proof bolts 34 require special tools for installation, and they can also be conventional bolts which are soldered or welded to fender 28, so that they cannot be removed with conventional wrenches. Although an open-face helmet is shown in this example, a taller full-face helmet (not shown) can be stored likewise by providing suitably longer straps.

Thus secured, helmet 44 is positively protected from damage and theft, and can be safely left on the motorcycle by the rider. Unlike the previous method of placing the helmet on the ground and locking it to a wheel, where it can get dirty, cage 10 prevents the helmet from getting dirty by securing it on top of the motorcycle.

When it is not needed, e.g., when riding the motorcycle, cage 10 can be unlocked and unhooked from the fender, and folded for storage. Cage 10 can be disassembled for storage by unlocking tab 36 from anchor 42, removing the helmet, pressing down ring 20, unhooking straps 16 and 18 from the fender, and detaching straps 16 and 18 from ring 20. Straps 12 and 14 are non-removably attached to ring 20 so that they will not be separated. Then strap 14 (with ring 20 and strap 12 attached) can be folded back so that its hook 32 can be disengaged from hoop 30.

Figure 2A:
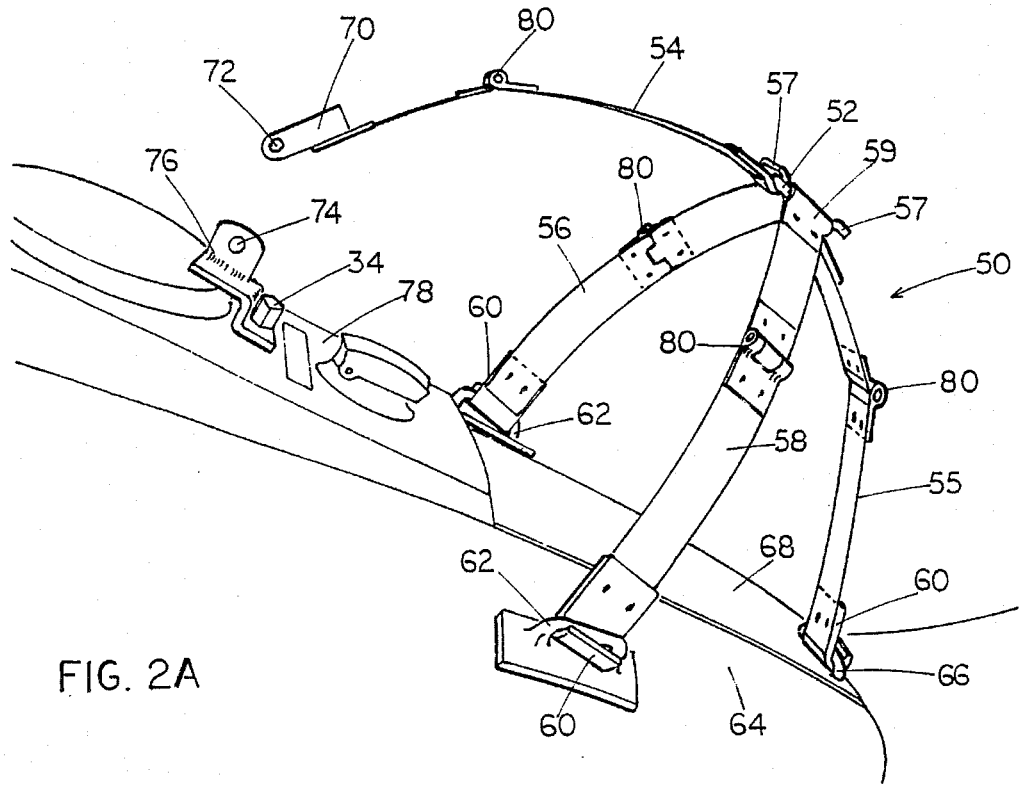
FIG. 2A is a side perspective view of an anti-theft cage for a helmet in accordance with a second embodiment of the invention.
Figure 2B:
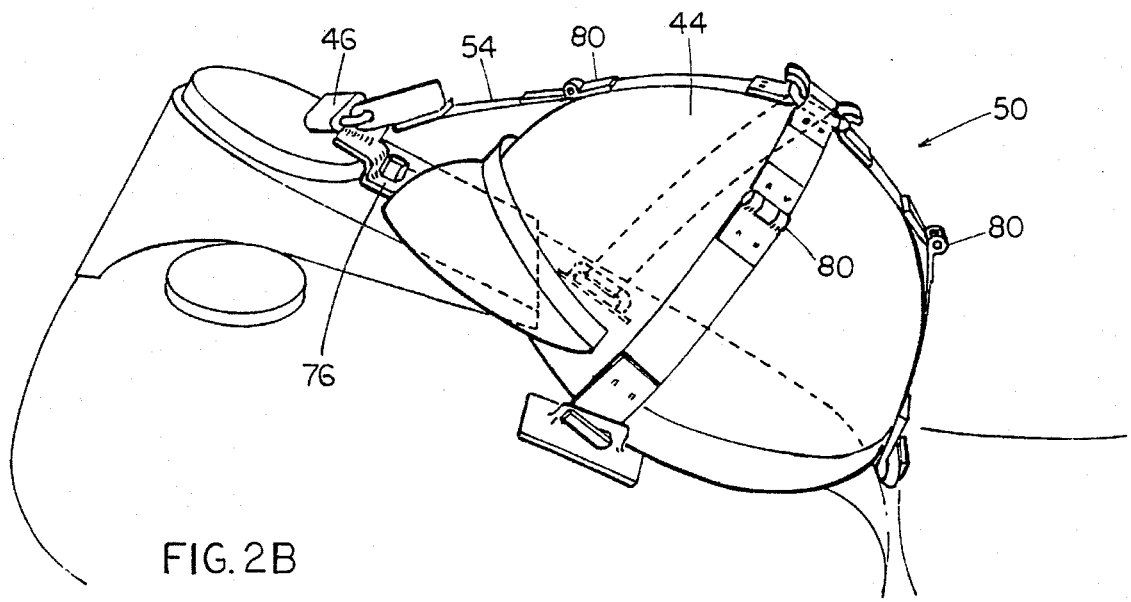
FIG. 2B is a side perspective view of the anti-theft cage of FIG. 2A in a locked condition.

Description—FIGS. 2A and 2B—Installation on Fuel Tank

In accordance with a second embodiment of the invention shown in FIG. 2A, an anti-theft cage 50 includes a rectangular ring 52 with a lockable front strap 54, a rear strap 55, and lateral straps 56 and 58 extending downwardly therefrom. Each of straps 54 and 55 has an outwardly-facing hook 57 on a top end for connecting to opposite sides of ring 52, and each of straps 56 and 58 has a loop 59 (one shown) on a top end for connecting to the other opposite sides of ring 52.

Each of straps 56 and 58 has an outwardly-facing hook 60 on its lower end engaging a hoop member 62 cemented to a side of a fuel tank 64 of the motorcycle. Rear strap 55 also has a hook 60 on its lower end engaging a hoop member 66 attached to a trim panel 68 on the frame of the motorcycle. A tab 70 attached to the end of lockable strap 54 has a hole 72 at a distal end thereof for aligning with a hole 74 on a T-shaped anchor 76, which is permanently attached to an instrument housing 78 with a tamper-proof bolt 34. Anchor 76 includes an "S" curve on its lower portion for clearing objects on housing 78. Each of straps 54, 55, 56, and 58 has a hinge 80 disposed at about its midpoint.

As shown in FIG. 2B, helmet 44 can be secured in cage 10 by lowering and locking strap 52 onto anchor 76 with padlock 46 disposed through their respective holes. Hinges 80 on the straps allow them to bend to conform to the contour of helmet 44, and also allow cage 50 to be folded into a very compact shape for storage when the cage is detached from the motorcycle.

Hoop member 62 can alternatively be welded or even bolted to tank 64, provided adequate seals are used to prevent leakage of fuel or its vapors.

Figure 3A:
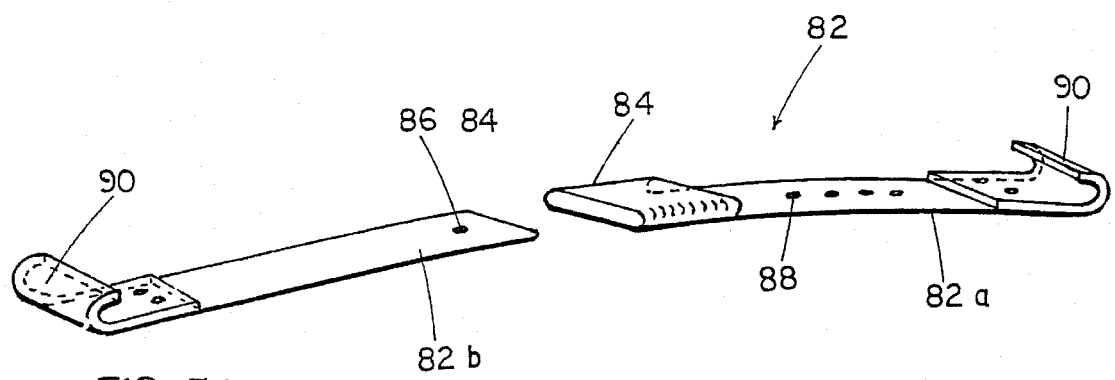
FIGS. 3A and 3B are side perspective views of an adjustable strap in accordance with a third embodiment of the invention.
Figure 3B:
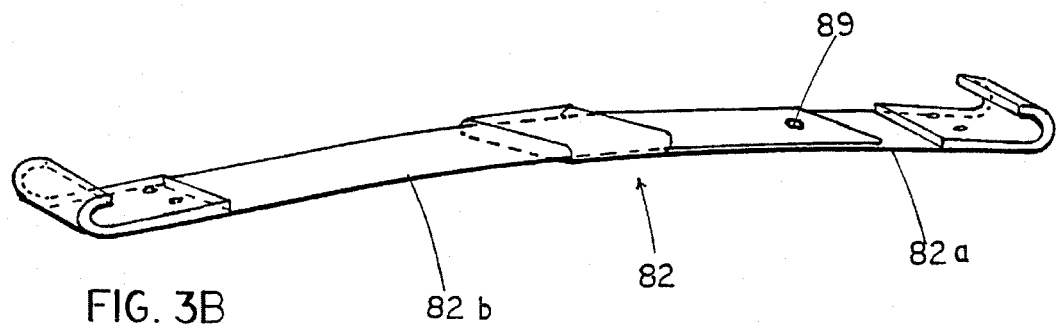

Description—FIGS. 3A and 3B—Adjustable Strap

In accordance with a third embodiment of the invention shown in the side perspective view in FIG. 3A, a strap 82 is set in length by having a section 82A with a sleeve 84 for receiving a section 82B. A hole 86 on section 82B can be aligned with and riveted to one of several holes 88 disposed along section 82A with a rivet 89 for fixing strap 82 at predetermined lengths. Hooks 90 are attached to the ends of strap 82, although loops similar to loop 59 shown in FIG. 2A can also be used. Strap 82 can replace the straps shown in the previous figures, so that the anti-theft cage can be made or assembled to accommodate a helmet of any size.

Figure 4:
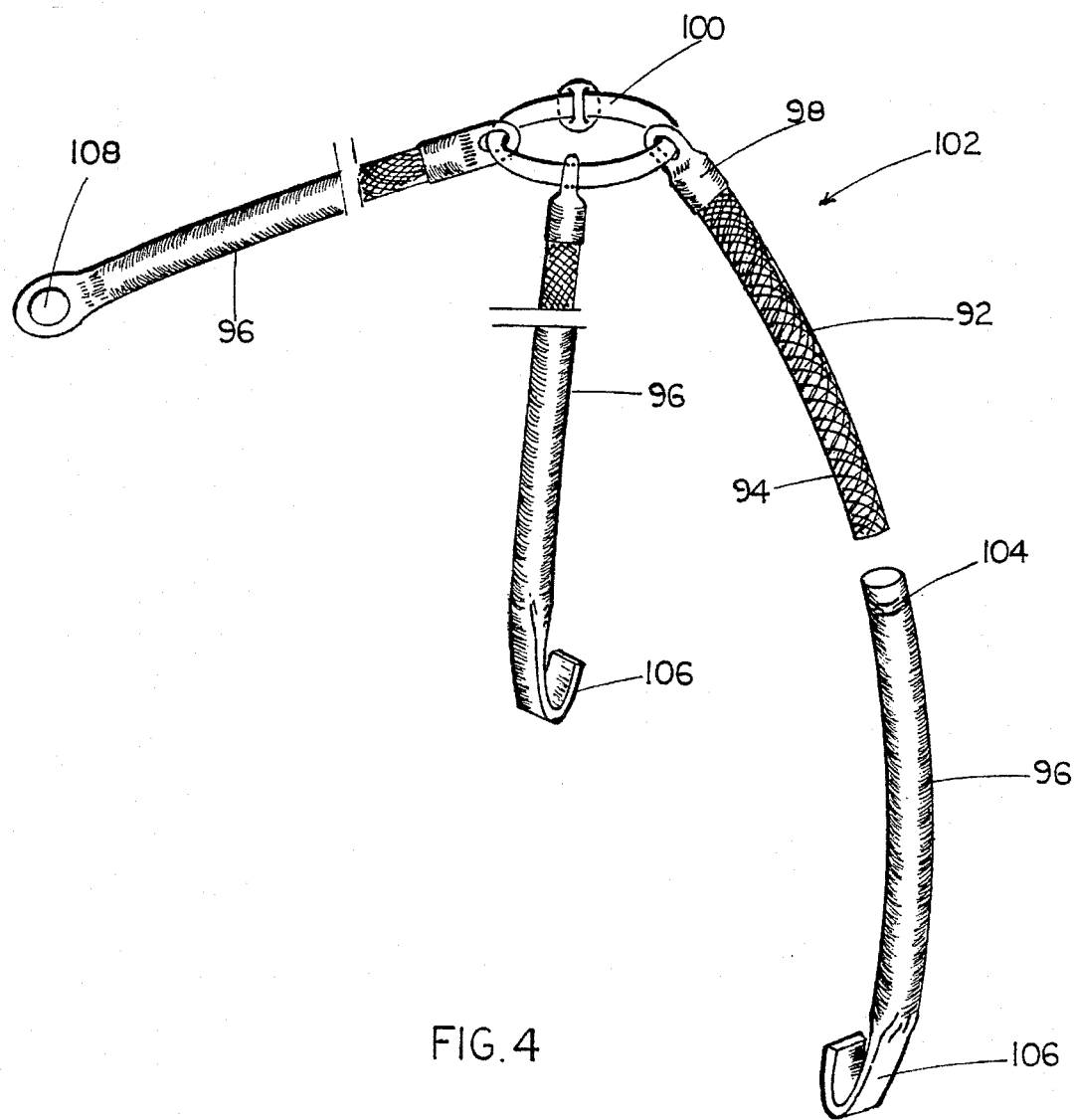
FIG. 4 is a side perspective view of an anti-theft cage for a helmet in accordance with a fourth embodiment of the invention.

Description—FIG. 4—Flexible Cage

In accordance with a fourth embodiment of the invention shown in the front perspective view in FIG. 4, four straps (only three of which are shown) are provided. Each strap, e.g., exemplary strap 92, includes a flexible steel cable 94 slidably received in a steel tube 96. Each strap has a loop 98 attached to its upper end and connected to a ring 100. The straps 92 are arranged to form a cage 102. Each strap can be fabricated in a suitable length so that the cage will fit a helmet of any size by sliding cable 94 within tube 96, and fixing them at the desired length with a crimp 104 formed on tube with a crimping tool (not shown). Three of the four tubes 96 include a flattened lower end with a hook 106 formed thereon. The remaining tube includes a flattened lower end with a hole 108 formed thereon. Cage 102 can serve as a direct replacement for the cages shown in the previous figures by suitably orienting hooks 106 for either fender (FIGS. 1A and 1B) or fuel tank (FIGS. 2A and 2B) installation. Because the straps are flexible, cage 102 will easily conform to helmets of any shape.

In the embodiments shown in FIGS. 2, 3, and 4, the cage cannot be unhooked when locked over a helmet, but it can be removed when it is unlocked and the helmet removed, as shown in FIG. 1.

SUMMARY, RAMIFICATIONS AND SCOPE

Accordingly the reader will see that I have provided an improved anti-theft cage for securing a helmet to a motorcycle to protect it from theft, dirt, and accidental damage. It can be adjusted to fit helmets of all types and sizes, including full-face and open-face helmets, and it can be installed at different locations on a motorcycle. It is made of strong materials so that it cannot be easily defeated. It cannot be detached from the motorcycle when it is locked over a helmet, but it can be easily detached when it is unlocked and the helmet is removed.

Although the above descriptions are specific, they should not be considered as limitations on the scope of the invention, but only as examples of the embodiments. Many other ramifications and variations are possible within the teachings of the invention. For example, instead of bolts, the hoop members and the T-shaped anchor can be attached to the motorcycle with rivets, high-strength mounting tape, permanent adhesive, welds, bolts with spinnable sleeves, etc. A rubber gasket can be cemented or taped between each hoop member and the gas tank to serve as a resilient filler between their different curvatures. The cage can be permanently attached to the motorcycle instead of being removable. The straps can be covered with a soft material, such as plastic coating, so that they do not scratch the helmet. The hoop members can be provided as built-in parts of the motorcycle. A lock can be integrally or permanently attached to the end of one of the straps, instead of using a separate shackle lock. The cage can be used to lock other objects to other vehicles or objects, e.g., to lock a tool box to a pickup truck, to lock a helmet to a bike, etc. The cage can also be arranged in other shapes, such as a grid, a triangle, a polygon, etc., in addition to a cruciform shape. Therefore, the reader is requested to determine the scope of the invention by the appended claims and their legal equivalents, and not by the examples given.

I claim:

1. An anti-theft device for securing one object of a predetermined size to another object, comprising:

a plurality of elongated straps, said straps each being fixed to a predetermined length for snugly holding said one object when said straps are connected together to form a cage for said one object, said straps being connected together to form said cage for snugly holding said one object, and locking means for locking said cage onto said other object, said locking means comprising a hole disposed on a lower end of one of said straps, a hook disposed on a lower end of each remaining strap, a plurality of hoop members attached to said other object for engaging said hooks, and a locking anchor attached to said other object, said locking anchor having a hole therein for aligning with said hole on said one of said straps, said aligned holes being adapted to receive a lock therein for locking said cage onto said other object, whereby when said one object is received in said cage and said cage is locked onto said other object, said one object will be positively protected from theft and accidental damage.

2. An anti-theft device adapted for securing a helmet having a predetermined contour to a motorcycle, comprising:

a plurality of elongated straps connected at a generally central point and extending downwardly therefrom in radial directions for forming a cage for receiving said helmet therein, each of said elongated straps having a hook disposed at a lower end, a locking strap having an upper end pivotably connected together with said elongated straps at said central point, said locking strap having a lower end with a hole therein, a plurality of hoop members each attached to said motorcycle for detachably engaging said hook of one of said elongated straps, and a locking anchor attached to said motorcycle, said locking anchor having a hole therein for aligning with said hole on said locking strap, said holes being adapted to receive a lock therein when aligned, whereby when said locking strap is pivoted upwardly, said helmet can be placed within said cage, and when said helmet is positioned within said cage, said locking strap can be lowered and locked onto said locking anchor with said lock, whereby said helmet is thereby positively protected from theft and accidental damage, and said locking strap can be unlocked and said elongated straps unhooked from said hoop members so that said cage can be removed from said motorcycle for storage.

3. The anti-theft device of claim 2 wherein said elongated straps and said locking strap are each comprised of two separate rigid sections hingeably connected, so that said straps are bendable for conforming to said contour of said helmet.

4. The anti-theft device of claim 2 wherein said elongated straps and said locking strap each includes a flexible steel cable bendable for generally conforming to said contour of said helmet.

5. The anti-theft device of claim 2 wherein said elongated straps and said locking strap are each fixed to a predetermined length for snugly engaging a helmet of a predetermined size.

6. The anti-theft device of claim 5 wherein said straps each include a first section with a sleeve receiving a second section, and fastening means for fastening said sections together to said predetermined length.

7. The anti-theft device of claim 6 wherein said elongated straps each include a tube receiving a flexible steel cable therein, and fastening means for fastening said flexible steel cable within said tube to said predetermined length.

8. A method for securing a helmet to a motorcycle, comprising:

(a) providing a plurality of elongated straps connected together and arranged to form a cage, (b) providing a lockable strap having an upper end pivotably connected together with said elongated straps, (c) securing a lower end of each of said elongated straps to a motorcycle, (d) pivoting said lockable strap upwardly, (e) positioning said helmet in said cage, and (e) lowering and locking said lockable strap onto said motorcycle with locking means, so that said helmet is positively protected from theft and accidental damage.

9. The method of claim 8 wherein each of said elongated straps includes a hook disposed at a lower end thereof, said hook being secured to said motorcycle by engaging a hoop member attached thereon.

10. The method of claim 8 wherein said lockable strap includes a hole for aligning with a hole on a locking anchor attached to said motorcycle, said holes being adapted for receiving said locking means when aligned.

11. The method of claim 8 wherein said elongated straps and said locking strap each have a predetermined length for snugly engaging a helmet of a predetermined size.

* * * * *

UNITED STATES PATENT AND TRADEMARK OFFICE
CERTIFICATE OF CORRECTION

PATENT NO. : 5,531,364
DATED : July 2, 1996
INVENTOR(S) : JOSEPH BUIS

It is certified that error appears in the above-indentified patent and that said Letters Patent is hereby corrected as shown below:

Col. 1, line 13, change "siring" to —sitting—.

Signed and Sealed this

Twenty-fifth Day of February, 1997

Attest:

Attesting Officer

BRUCE LEHMAN

Commissioner of Patents and Trademarks